United States Patent [19]

Young

[11] 4,020,683

[45] May 3, 1977

[54] FLUID MEASURING VALVE AND SYSTEM TO MEASURE MILES PER GALLON OF A VEHICLE

[76] Inventor: Michael R. Young, 5808 Ramblewood, Brighton, Mich. 48116

[22] Filed: June 21, 1976

[21] Appl. No.: 698,099

[52] U.S. Cl. .................................. 73/114; 91/459
[51] Int. Cl.² ........................................ G01F 9/00
[58] Field of Search ................ 73/114, 113, 194 E, 73/232; 91/361, 459

[56] References Cited

UNITED STATES PATENTS

| | | | |
|---|---|---|---|
| 2,964,940 | 12/1960 | Dickey | 73/113 |
| 3,344,667 | 10/1967 | Maltby | 73/113 X |
| 3,549,868 | 12/1970 | Watson et al. | 73/114 X |

Primary Examiner—Jerry W. Myracle

[57] ABSTRACT

A fuel measuring system which accurately measures fuel consumed by a vehicle and the distance traveled by the vehicle and provides a detectable signal of distance traveled per quantity of fuel consumed. The system includes a valve with a reservoir which measures fuel flow from the fuel pump. A speed sensor provides a signal indicative of a given distance traveled by the vehicle. The number of times the reservoir is filled and unfilled with fuel is compared via a logic circuit with a signal from the speed sensor to provide a detectable readout of distance traveled by the vehicle per quantity of fuel consumed. A valve may be used by itself to measure fluid flow in a given passage.

8 Claims, 5 Drawing Figures

FLUID MEASURING VALVE AND SYSTEM TO MEASURE MILES PER GALLON OF A VEHICLE

BACKGROUND OF THE INVENTION

It is desirable to know the distance traveled by a vehicle per quantity of fuel consumed during all modes of operation. In this way we can better control the operation of the vehicle to decrease the vehicle's fuel consumption. In this end a number of devices have been proposed and are in use which determine the distance traveled per given quantity of fuel consumed. Most, if not all, of these known devices are inaccurate, require regular adjustment, require special adaptation for different installations, will not determine high and low flow rates with the same degree of accuracy, and/or are unnecessarily expensive and complex.

SUMMARY OF THE INVENTION

It is accordingly a broad object of the present invention to provide an inexpensive device which will sense a given unit of measurement, such as, time or distance of travel, per a quantity of fluid flowing through a conduit.

It is a further object of this invention to provide such a device to more specifically determine a given distance of vehicle travel per the vehicle's fuel consumption.

BRIEF DESCRIPTION OF THE DRAWINGS

The preceding objects will be more fully understood with reference to the drawings and description of a preferred embodiment of the invention, wherein.

DESCRIPTION OF THE PREFERRED EMBODIMENT

The fluid measuring system will be described as if it were connected within an automobile to measure the miles traveled per gallon of gasoline consumed. With mirror modification the system could also be used to measure the volume of fluid per any other given unit, such as a time interval.

Figure 1:
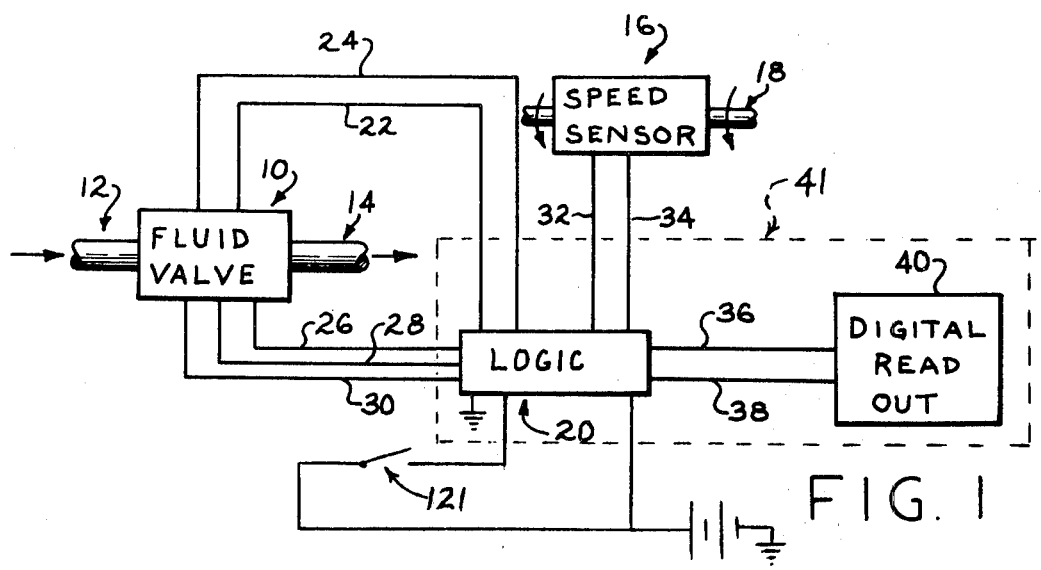
FIG. 1 is a schematic view of the components of a fluid measuring system according to the invention.

The system of FIG. 1 includes a fluid valve 10 in series fluid communication with a pair of conduits 12 and 14. Conduits 12 and 14 are in the fuel line used to transfer fuel from the fuel pump to the carburetor or fuel injection system. A speed sensor 16 is connected in series with the speedometer cable 18 of the automobile to measure the number of revolutions of the cable. A logic circuit 20 is electrically connected via power lines 22 and 24 to fluid valve 10, via sensing lines 26, 28 and 30 to fluid valve 10, via sensing lines 32 and 34 to speed sensor 16, and via information transfer lines 36 and 38 to a digital readout 40. Digital readout 40 provides two numbers which are indicative of the miles per gallon that the automobile achieved during the last sampling period of the device. The logic and digital readout can be packaged together. The details of each of the components of the system will herein-after be described in greater detail.

Figure 2:
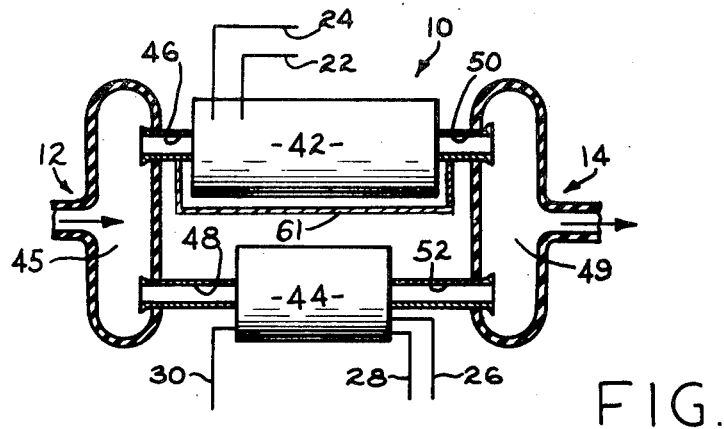
FIG. 2 is a more detailed view of the fluid valve of the FIG. 1 system.

In FIG. 2, fluid valve 10 includes an ON-OFF fluid flowthrough portion 42 and a fluid storage portion 44. Conduit 12 includes a central upstream chamber 45 in fluid communication respectively with passages 46 and 48 of portions 42 and 44. Chambers 45 and 49 transfer fluid to, and receive fluid from, the respective passages. In use, the central chambers are filled with fluid.

Figure 3:
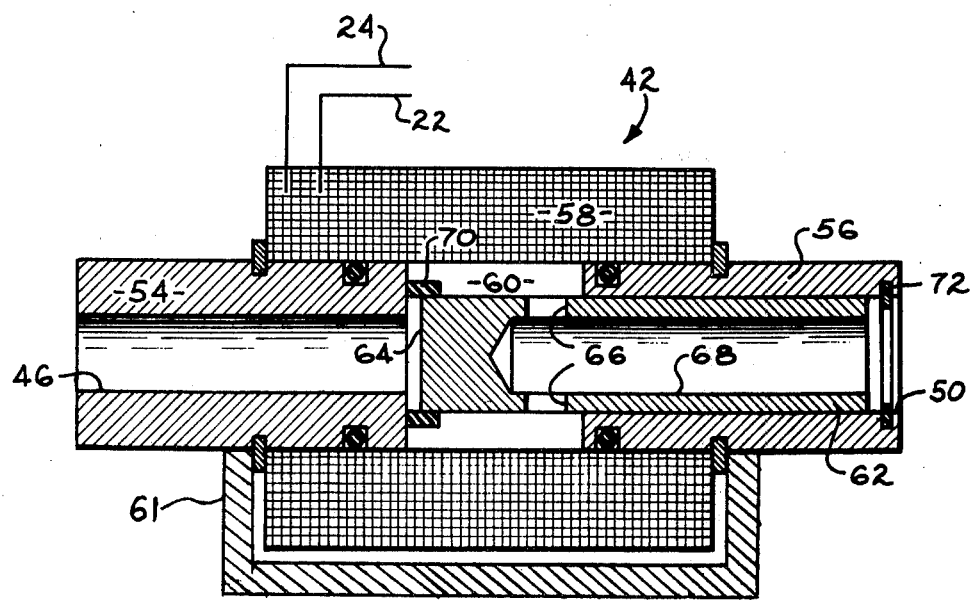
FIG. 3 is a side elevational view in section of one portion of the fluid valve of FIG. 2.

The ON-OFF fluid flow-through portion 42 is illustrated in greater detail in FIG. 3. Passages 46 and 50, respectively, are defined by conduits 54 and 56, made of magnetic material such as steel. A coil, 58, encircles one end of conduits 54 and 56, and defines a space, 60, therebetween. Coil 58 is a winding of wire, forming the coil portion of a solenoid. The coil is preferably encased in a non-magnetic material to prevent fluid contact with the coil wires. A magnetic material, 61, provides a flux path for the coil. Appropriate "O" rings are interposed respectively between conduits 54 and 56, and coil 58 to prevent fluid leakage. Further appropriate means are provided to retain conduits 54 and 56 relative to coil 58.

A piston, 62, made of a magnetic material such as steel, is slidable in conduit 56. Piston 62 is movable from a first position in which fluid may flow through passage 46 around end 64 of piston 62 into space 60, and from these through radial passages 66 in piston 62 to a centrally-disposed passage 68 and then into passage 50, to a second position (illustrated in FIG. 3) in which fluid is blocked from flowing from passage 46 to space 60. For blocking, end 64 is larger than passage 46 and includes an annular resilient sealing ring 70. A snap ring 72 is included in passage 50 to restrict rightward movement (as illustrated in FIG. 3) of piston 62 beyond the first position. In both positions of piston 62, passage 68 is in fluid communication with space 60 via radial passage 66.

Piston 62, when located in the first position, provides a sufficiently large area around end 64 so that fluid flows to passage 60. Similarly, radial passages 66 provide fluid flow to passage 68.

Power lines 22 and 24 are connected to coil 58. Upon a flow of current through lines 22 and 24, and hence coil 58, piston will be drawn to the second position shown in FIG. 3 to block fluid flow through portion 42. Upon an interruption of current flow the fluid will force piston 62 to its first position, to the right in FIG. 3, and therby open fluid communication through portion 42 from passage 46 to passage 50.

Figure 4:
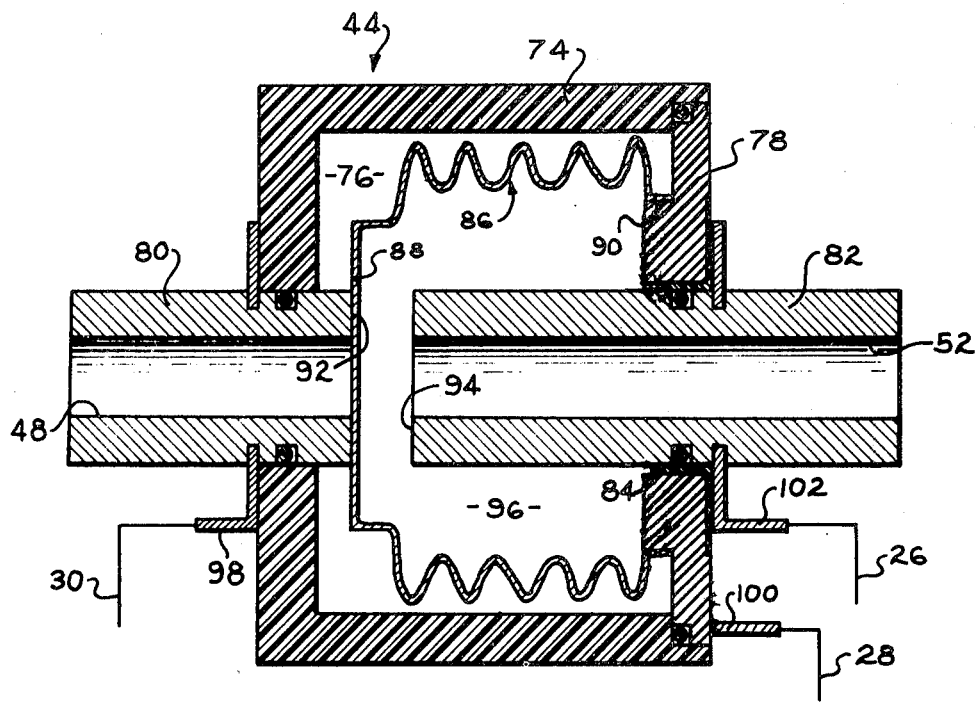
FIG. 4 is a side elevational view in section of another portion of the fluid valve of FIG. 2.

Referring now to FIG. 4, fluid storage portion 44 includes a cup-shaped housing portion 74 made of a non-electrical conducting material, and defining a large first storage chamber 76. The open end of housing 74 is partially enclosed by an annular ring 78 made of an electrical-conducting material. Conduits 80 and 82 project through axially-aligned openings respectively in housing 74 and ring 78 and define passages 48 and 52. Conduits 80 and 82 are made of an electrical conducting material. Further, conduit 82 is electrically separated from ring 78 by an annular non-electrically conducting insular 84. Appropriate seals are provided, as illustrated, to prevent fluid leakage.

Placed internally of housing 74 is a cup-shaped bellows 86 having a flat sealed end 88 and an open end 90 encircling the protruded lip of annular ring 78. Bellows 86 is made of a metallic electrically conducting material and is of a size which requires a slight compression to fit between ring 78 and end 92 of conduit 80. Open end 90 is sealed 360° to ring 78 to prevent fluid leakage and to allow electrical conductivity therebetween. The bellows is constructed to take the position illustrated in FIG. 4. In the event piston 62 is in the first or open position allowing fluid flow between passages 46 and 50, the bellows will remain in the position illustrated in FIG. 4. Upon piston 62 moving to the second, or blocking position illustrated in FIG. 3, the pressure of the fluid in chamber 45 will force the end 88 of bellows 86 to the right in FIG. 4 into contact with the end 94 of conduit 82. This will result in a decrease in the volume of the chamber 96 by an exact and repeatable amount and an increase in the volume of chamber 76 by the same amount. Upon movement of piston 62 to the first, or open position, bellows 86 will resume its original position, that illustrated in FIG. 4, with a resultant increase in the volume of chamber 96 and a corresponding decrease in the volume of chamber 76. Appropriate electrical connectors 98, 100 and 102 are respectively connected to conduit 80, ring 78, conduit 82 and lines 30, 28 and 26 respectively.

In operation of fluid valve 10, logic circuit 20 energizes coil 58 to move piston 62 to the block position illustrated in FIG. 3. It is assumed that fluid has been flowing from passage 12 to passage 14 prior to energization of coil 58. Further, it is assumed that chambers 76 and 96 are filled with fluid. The fluid in chamber 45 not being able to flow through passage 46 flows into passage 48, forcing an equal amount of fluid out of chamber 96 to chamber 49 and hence into passage 14. Upon contact of end 88 of bellows 86 with end 94 of conduit 82 an electrical signal is sent via lines 26 and 28 to logic circuit 20, and coil 58 is de-energized. Fluid is then free to flow from passage 46 to 50. Bellows 86 moves back to the position illustrated in FIG. 4, forcing fluid out of chamber 76 to passage 46, while fluid from passage 50 goes both to passage 14 and to chamber 96. Upon contact of end 88 of bellows 86 with end 92 of conduit 80 another electrical signal is sent via lines 28 and 30 to logic circuit 20, and coil 58 is again energized to move piston 62 to the blocking position illustrated in FIG. 3. The described cycle continues to repeat itself until the system is turned off. By knowing the total effective area of bellows 86 and the amount of its movement from one position to another, the precise amount of fluid flowing through fluid valve 10 on each cycle can be determined. This will be discussed in greater detail later in the description.

Figure 5:
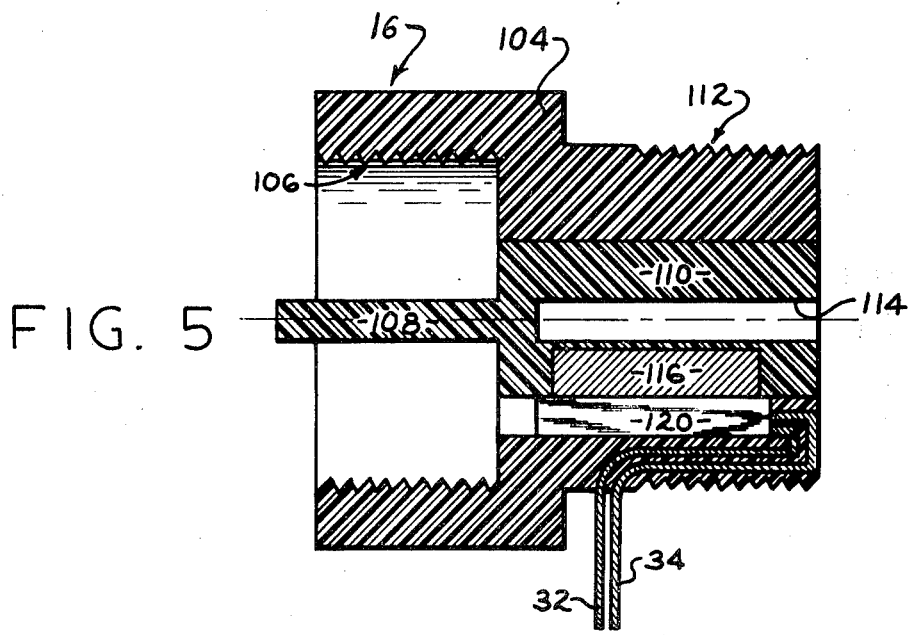
FIG. 5 is a side elevational view in section of the speed sensor of the FIG. 1 system.

Referring now to FIG. 5, speed spensor 16 is designed for use on automobiles built in the United States by either General Motors Corporation or Chrysler Corporation. Appropriate changes are contemplated for other automobiles since the fundamental principle of operartion will be the same. The speed sensor comprises a non-magnetic body 104 having an internal thread 106 to be threadedly engaged with an external thread on the speedometer boss of the automobile transmission once the speedometer cable has been unthreaded and removed from the boss. A square shaft 108 extends from a rotor 110 rotatably mounted in a body 104 and fits into a square hole located in the rotating member within the transmission boss. External threads 112 on body 104 are provided to be threaded into the internal female threads of the speedometer cable and a square hole 114 is provided in rotor 110 for engagement with the square shaft within the speedometer cable. Rotor 110, therefore, rotates in a 1:1 relationship with the speedometer cable of the automobile.

Rotor 110 includes a permanent magnet 116 mounted near its outer circumference. Adjacent the circumference is a reed switch 120 mounted in body 104, which closes an electrical contact each time magnet 116 is located, as illustrated in FIG. 5. Sensing lines 32 and 34 are connected to reed switch 120 and to logic circuit 20 (FIG. 1).

Reed switch 120 opens and closes once upon each rotation of rotor 110 and sends an electrical signal representing each rotation to logic circuit 20. All cars made in the United States of America are designed with the same relationship between "speedometer cable speed" and "indicated speedometer speed." The design standard is SAE J 678, which specifies that the speedometer will turn 1000 RPM at a vehicle speed of 60 miles per hour. Appropriate figures can also be calculated for other automobiles.

The system in an automobile operates as follows: Logic circuit 20 calculates the number of miles the vehicle will travel per gallon of fuel consumed based upon inputs from speed sensor 16 and fluid valve 10. The fuel consumption is displayed digitally in miles per gallon on digital readout 40 until updating occurs. During these readings the fuel valve solenoid portion is constantly being recycled. Logic cycle includes a portion that clears the memory whenever the brake pedal is applied resulting in closure of brake switch 121. The electronics in the logic circuit are state of the art and therefore will only be described conceptually.

The calculation of miles per gallon is based upon inputs from fluid valve 10 and speed sensor 16. Speed sensor 16 puts out 1000 pulses per each mile based upon the SAE J 678 standard with one pulse existing per each revolution of the speedometer cable. Fluid valve 10 displaces a constant volume of fuel during each movement of bellows 86 between its two positions. This volume is $V = AbSb/231$ where Ab is the effective area of bellows 86 in square inches; Sb is the distance end 88 travels between end 92 and end 94, and V is the volume in U.S. gallons. An expression for miles per gallon can be derived where $MPG = 0.231$ (number of impulses)/AbSb. If AbSb is made to equal 0.231, then MPG equals the number of pulses from speed sensor 160 between each movement of end 88 from end 92 to end 94. This can be very easily accomplished in logic circuit 20 by turning two counting registers "ON" and "OFF" when the end 88 makes electrical contact with end 92 and end 94 respectively. The pulse count, i.e., MPG, is held in the computer memory and digitally displayed. The display is updated everytime end 88 contacts end 94.

Other design modifications are contemplated. For example, bellows 86 can be replaced by a metal piston that is slideable between ends 92 and 94. Annular outer portion of housing 74 could be made of metal and insulated from conduits 80 and 82 to provide the electrical connection for line 28, and accordingly the circuits between lines 28 and 30 and between lines 26 and 28. Further, several magnets or reed switches or both could be used in speed sensor 16 to increase the number of pulses counted. Appropriate changes would have to be made in the logic circuit.

What is claimed is:

1. A valve for transferring fluid from a first conduit to a second conduit, said valve comprising:

A. a passage in open fluid series communication with said first and second conduits;
B. means operative from a first position providing fluid communication through said passage to a second position blocking fluid communication through said passage;
C. means for biasing said operative means to one of said positions;
D. means responsive to a signal to move said operative means to said other position;
E. a first variable volume reservoir for storing a quantity of fluid and having a predetermined maximum volume, said first reservoir being in open fluid communication with said passage on the upstream side of said operable means,
F. a second variable volume reservoir for storing a quantity of fluid and having a predetermined maximum volume, said second reservoir being in open fluid communication with said passage on the downstream side of said operable means;
G. means to expand the volume of one of said reservoirs and simultaneously contract the volume of the other reservoir by equal amounts when said operative means is in one of said positions and to expand said volume of said other reservoir and contracts said volume of said one reservoir by equal amounts when said operative means is in said other position; and
H. means to provide a signal to said responsive means when one of said reservoirs expand to said predetermined maximum volume.

2. A valve according to claim 1 wherein:
I. said biasing means biases said operative means to said first position;
J. said means to expand the volume of said first reservoir operates when said operative means is in said second position; and
K. said signal means is responsive when said second reservoir expands to said predetermined volume.

3. A valve according to claim 2 wherein:
L. said passage is defined by first and second axially-spaced magnetic conduits;
M. said operative means is a magnetic conduit slideably received in said second spaced conduit and including a head portion sealing the passage in said first spaced conduit when said slideable conduit is in said second position and spaced from said passage in said first spaced conduit when in said first position;
N. said responsive means is an electrically conducting coil encircling said first and second spaced conduits and creating a magnetic field; and
O. said signal is an electrical current flowing through said coil.

4. A fluid measuring system for determining the amount of fluid flowing through a conduit per a unit of measurement, said system comprising:

A. a passage in open fluid series communication with said conduit;
B. means operative from a first position providing fluid communication through said passage to a second position blocking fluid communication through said passage;
C. means for biasing said operative means to one of said positions;
D. means responsive to a signal to move said operative means to said other position;
E. a first variable volume reservoir for storing a quantity of fluid and having a predetermined maximum volume, said first reservoir being in open fluid communication with said passage on the upstream side of said operable means;
F. a second variable volume reservoir for storing a quantity of fluid and having a predetermined maximum volume, said second reservoir being in open fluid communication with said passage on the downstream side of said operable means;
G. means to expand the volume of one of said reservoirs and simultaneously contract the volume of the other reservoir by equal amounts when said operative means is in one of said positions and to expand said volume of said other reservoir and contracts said volume of said other reservoir by equal amounts when said operative means is in said other position;
H. means to provide a first signal to said responsive means when one of said reservoirs expand to said predetermined maximum volume;
I. means to sense the occurrence of said unit of measurement and to provide a second signal indicating said occurrence;
J. means to sense said first and second signals and to provide a third signal indicating the number of first signals occuring relative to a given number of second signals; and
K. means to provide a detectable readout of the third signal.

5. A system according to claim 4 wherein:
L. said fluid conduit is located in the fuel supply passage of an internal combustion engine of a vehicle; and
M. said unit of measurement is a distance traveled by said vehicle.

6. A system according to claim 5 wherein said sensing means periodically updates said third signal to provide a new detectable signal upon each update.

7. A system according to claim 6 further comprising means to cancel said detectable signal upon application of a brake within said vehicle.

8. A system according to claim 7 wherein said means sensing said unit of measurement is a speed sensor sensing the number of rotations of the speedometer cable within said vehicle and providing said second signal upon a given number of rotations.

* * * * *